(12) United States Patent
Tang et al.

(10) Patent No.: US 10,355,612 B2
(45) Date of Patent: Jul. 16, 2019

(54) FLYBACK POWER CONVERTER CIRCUIT AND SECONDARY SIDE CONTROLLER CIRCUIT THEREOF

(71) Applicant: RICHTEK TECHNOLOGY CORPORATION, Zhubei, Hsinchu (TW)

(72) Inventors: Chien-Fu Tang, Hsinchu (TW); Su-Yuan Lin, Hsinchu (TW); Yi-Wei Lee, Taipei (TW); Isaac Y. Chen, Hsinchu (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 0 days.

(21) Appl. No.: 15/865,212

(22) Filed: Jan. 8, 2018

(65) Prior Publication Data

US 2018/0212528 A1    Jul. 26, 2018

Related U.S. Application Data

(60) Provisional application No. 62/449,743, filed on Jan. 24, 2017.

(30) Foreign Application Priority Data

Apr. 6, 2017    (TW) .............................. 106111581 A

(51) Int. Cl.
  *H02M 3/335*    (2006.01)
  *H02M 1/36*    (2007.01)
  (Continued)

(52) U.S. Cl.
  CPC ......... *H02M 3/33592* (2013.01); *H02M 1/08* (2013.01); *H02M 1/32* (2013.01); *H02M 1/36* (2013.01); *Y02B 70/1475* (2013.01)

(58) Field of Classification Search
  CPC ............ H02M 1/08; H02M 1/32; H02M 1/36; H02M 3/33592
  See application file for complete search history.

(56) References Cited

U.S. PATENT DOCUMENTS

| | | | | |
|---|---|---|---|---|
| 2001/0033506 | A1* | 10/2001 | Farrington | ............... H02J 1/102 363/127 |
| 2003/0048643 | A1* | 3/2003 | Lin | ......................... H02M 1/36 363/21.06 |

(Continued)

*Primary Examiner* — Fred E Finch, III
(74) *Attorney, Agent, or Firm* — Tung & Associates

(57) ABSTRACT

A flyback power converter circuit converting an input voltage to an output voltage includes a transformer, a power switch, a synchronous rectifier (SR) switch, and a secondary side control circuit. The secondary side control circuit controls the SR switch to be ON when the power switch is OFF. The secondary side control circuit includes a driving switch for controlling the SR switch, a synchronous control circuit powered by a voltage related to the output voltage, which controls the driving switch to operate the SR switch, and a clamping circuit including a clamping switch and a clamping switch control circuit. The clamping switch control circuit controls the clamping switch according to a current inflow terminal voltage of the clamping switch and/or the voltage related to the output voltage, such that, during a secondary side power-on period, an equivalent impedance of the current inflow terminal of the clamping switch is smaller than a predetermined clamping impedance.

34 Claims, 9 Drawing Sheets

(51) Int. Cl.
*H02M 1/32* (2007.01)
*H02M 1/08* (2006.01)

(56) References Cited

U.S. PATENT DOCUMENTS

| | | | |
|---|---|---|---|
| 2005/0007082 A1* | 1/2005 | Bretz | H02M 1/32 |
| | | | 323/274 |
| 2011/0038182 A1* | 2/2011 | Li | H02M 3/33592 |
| | | | 363/21.06 |
| 2015/0138845 A1* | 5/2015 | Shinozaki | H02M 1/36 |
| | | | 363/21.1 |
| 2016/0336867 A1* | 11/2016 | Nystrom | H02M 3/33592 |
| 2017/0070151 A1* | 3/2017 | Lin | H02M 1/08 |
| 2018/0205312 A1* | 7/2018 | Peng | H02M 1/36 |

* cited by examiner

FLYBACK POWER CONVERTER CIRCUIT AND SECONDARY SIDE CONTROLLER CIRCUIT THEREOF

CROSS REFERENCE

The present invention claims priority to U.S. 62/449,743, filed on Jan. 24, 2017 and TW 106111581, filed on Apr. 6, 2017.

BACKGROUND OF THE INVENTION

Field of Invention

The present invention relates to a flyback power converter circuit. Particularly, it relates to a flyback power converter circuit which includes a secondary side synchronous rectifier switch and is able to reduce the parasitic capacitance coupling effect of the synchronous rectifier switch. The present invention also relates to a secondary side control circuit for use in the flyback power converter circuit.

Description of Related Art

FIG. 1A shows a prior art flyback power converter circuit (flyback power converter circuit 1). A transformer 10 includes a primary side winding W1 which receives an input voltage VIN. A power switch N1 controls the conduction of the primary side winding W1 to generate an output voltage VOUT at the secondary side winding W2. For higher efficiency, a synchronous rectifier (SR) switch N2 is provided at the secondary side of the transformer 10, which is coupled to the secondary side winding W2 to control the conduction time of the secondary side winding W2, such that the secondary side winding W2 is conductive when the primary side winding W1 is not conductive. The secondary side control circuit is located at the secondary side and is coupled to the SR switch N2, for controlling the SR switch N2 according to information of for example but not limited to the output voltage VOUT or the SR switch current.

The prior art circuit in FIG. 1A has a drawback as below. The SR switch N2 has a parasitic capacitance (such as the parasitic capacitance CP between the gate and the drain of the SR switch N2 as shown in the figure). Before the supply voltage VDD of the secondary side control circuit 20 achieves its normal operation level, the secondary side control circuit 20 cannot operate properly, and the SR switch N2 may be erroneously turned on because the control terminal DRV of the SR switch N2 is affected by the coupling effect of the parasitic capacitance CP. The supply voltage VDD is the power supply of the secondary side control circuit 20, which may be obtained for example directly from the output voltage VOUT, or by filtering, dividing or regulating the output voltage VOUT.

Referring to FIG. 1B, before the supply voltage VDD achieves the normal operating threshold VPR, the secondary side control circuit 20 cannot operate properly. At time point T1, due to the switching of the power switch N1 and the induction between the primary and the secondary side windings W1 and W2, the control terminal DRV of the SR switch N2 is coupled to a high level by the parasitic capacitance CP, causing the power switch N1 and the SR switch N2 to be conductive at the same time, resulting in large current spikes through the power switch N1 and the SR switch N2 to damage these two switches.

FIGS. 2A-2C show several other prior art flyback power converter circuits attempting to solve the problems as addressed. As shown in FIGS. 2A and 2B, the flyback power converter circuits 2A and 2B include respectively a resistor R1 and a capacitor C1 coupled to the control terminal DRV of the SR switch N2. However, the equivalent impedance of R1 or C1 has to be small to an extent that the coupling effect can be reduced effectively, but the small impedance may cause extra power consumption, slow transient, or efficiency loss. The flyback power converter circuit 2C shown in FIG. 2C includes an SR switch N3 whose threshold voltage is higher (the threshold voltage of N3>the threshold voltage of N1, i.e. Vth (N3)>Vth(N1)) to avoid the aforementioned problems. However, this prior art has a higher manufacturing cost and lower efficiency.

Compared to the prior art circuits in FIGS. 1A and 2A-2C, the present invention is advantageous in that the aforementioned parasitic coupling effect can be reduced without increasing cost or efficiency loss.

SUMMARY OF THE INVENTION

From one perspective, the present invention provides a flyback power converter circuit, comprising: a transformer, which includes a primary side winding for receiving an input voltage and a secondary side winding for generating an output voltage; a power switch which is coupled to the primary side winding, and configured to operably control a conduction time of the primary side winding; a synchronous rectifier (SR) switch which is coupled to the secondary side winding, and configured to control a conduction time of the secondary side winding which is conductive when the primary side winding is not conductive; and a secondary side control circuit which is located at a secondary side of the transformer and is coupled to the SR switch, and which is configured to operably control the SR switch, the secondary side control circuit including: a first driving switch, wherein a current inflow terminal of the first driving switch is coupled to a control terminal of the SR switch, and a current outflow terminal of the first driving switch is coupled to a reference voltage; a synchronous control circuit which is coupled to a control terminal of the first driving switch and is powered by a voltage which is related to the output voltage (an output voltage related voltage), the synchronous control circuit being configured to operably control the first driving switch to operate the SR switch; and a clamping circuit, including: a clamping switch, coupled to the control terminal of the SR switch; and a clamping switch control circuit which is coupled to a control terminal of the clamping switch, and configured to operably control the control terminal of the clamping switch according to a voltage on a current inflow terminal of the clamping switch and/or the output voltage related voltage, such that in a secondary side power-on time period, an equivalent impedance of the current inflow terminal of the clamping switch is smaller than a predetermined clamping impedance; wherein the secondary side power-on time period is a time period before the output voltage related voltage achieves a predetermined power-on voltage threshold.

In one embodiment, the clamping switch includes the first driving switch, and the control terminal, the current inflow terminal and a current outflow terminal of the clamping switch correspond to the control terminal, the current inflow terminal and the current outflow terminal of the first driving switch.

In one embodiment, the clamping switch control circuit includes: a first clamping resistor and/or a first clamping current source circuit, which is coupled between the control terminal and the current inflow terminal of clamping switch such that in the secondary side power-on time period, the equivalent impedance of the current inflow terminal of the clamping switch is smaller than the predetermined clamping impedance; wherein the clamping current source circuit is configured to operably generate a clamping current from the current inflow terminal of the clamping switch to the control terminal of the clamping switch.

In one embodiment, the clamping switch control circuit includes: a first clamping resistor and/or a first clamping current source circuit, which is coupled between the control terminal of clamping switch and the output voltage related voltage such that in the secondary side power-on time period, the equivalent impedance of the current inflow terminal of the clamping switch is smaller than the predetermined clamping impedance; wherein the clamping current source circuit is configured to operably generate a first clamping current from the output voltage related voltage to the control terminal of the clamping switch.

In one embodiment, the secondary side control circuit further includes a second driving switch which is coupled between the control terminal of the SR switch and a driving input voltage, wherein the clamping switch control circuit includes: a first clamping resistor and/or a first clamping current source circuit, which is coupled between the control terminal of clamping switch and the driving input voltage such that in the secondary side power-on time period, the equivalent impedance of the current inflow terminal of the clamping switch is smaller than the predetermined clamping impedance; wherein the clamping current source circuit is configured to operably generate a clamping current from the driving input voltage to the control terminal of the clamping switch, wherein the driving input voltage relates to the output voltage.

In one embodiment, the secondary side control circuit further includes a power-on reset circuit which generates a power-on reset signal according to the output voltage and a reset voltage threshold, wherein the clamping switch control circuit includes: an impedance control switch, electrically coupled between the control terminal of the clamping switch and the output voltage related voltage or the current inflow terminal of the clamping switch, wherein the power-on reset signal controls the impedance control switch, such that in the secondary side power-on time period, the equivalent impedance of the current inflow terminal of the clamping switch is smaller than the predetermined clamping impedance.

In one embodiment, the clamping switch control circuit further includes a clamping capacitor which is coupled in parallel with the first clamping resistor and/or the first clamping current source circuit.

In one embodiment, the clamping switch control circuit further includes a voltage limiting circuit which limits a voltage on the control terminal of the clamping switch to be not larger than a predetermined voltage upper limit.

In one embodiment, the clamping switch control circuit further includes a reverse blocking diode which is coupled in series between the control terminal of the clamping switch and one of the clamping resistor, the clamping current source circuit, or the impedance control switch, and is configured to operably block a reverse current, wherein a current outflow terminal of the reverse blocking diode is electrically connected to the control terminal of the clamping switch.

In one embodiment, the clamping switch control circuit further includes a body diode of the second driving switch.

In one embodiment, the secondary side control circuit further includes a second driving switch, coupled between the control terminal of the SR switch and a driving input voltage, wherein the clamping switch control circuit further includes: a first impedance control switch, coupled in series between the control terminal of the clamping switch and the first clamping resistor or the first clamping current source circuit; a second clamping resistor and/or a second clamping current source circuit; a second impedance control switch, coupled in series with the second clamping resistor or the second clamping current source circuit between the control terminal of the clamping switch and the driving input voltage, wherein the clamping current source circuit is configured to operably generate a second clamping current from the driving input voltage to the control terminal of the clamping switch; and a power determining circuit, configured to operably generate a switch control signal according to the output voltage related voltage and the driving input voltage to control the switching of the first impedance control switch and the second impedance control switch, such that in the secondary side power-on time period, the equivalent impedance of the current inflow terminal of the clamping switch is smaller than the predetermined clamping impedance.

From another perspective, the present invention provides a secondary control circuit, for use in a flyback power converter circuit which includes: a transformer, which includes a primary side winding for receiving an input voltage and a secondary side winding for generating an output voltage; a power switch which is coupled to the primary side winding, configured to operably control a conduction time of the primary side winding; and a synchronous rectifier (SR) switch which is coupled to the secondary side winding, configured to control a conduction time of the secondary side winding which is conductive when the primary side winding is not conductive; the secondary control circuit being located at a secondary side of the transformer and coupled to the SR switch configured to operably control the SR switch; the secondary control circuit comprising: a first driving switch, wherein a current inflow terminal of the first driving switch is coupled to a control terminal of the SR switch, and a current outflow terminal of the first driving switch is coupled to a reference voltage; a synchronous control circuit which is coupled to a control terminal of the first driving switch and is powered by an output voltage related voltage, the synchronous control circuit being configured to operably control the first driving switch to operate the SR switch; and a clamping circuit, including: a clamping switch, coupled to the control terminal of the SR switch; and a clamping switch control circuit which is coupled to a control terminal of the clamping switch, configured to operably control the control terminal of the clamping switch according to a voltage on a current inflow terminal of the clamping switch and/or the output voltage related voltage, such that in a secondary side power-on time period, an equivalent impedance of the current inflow terminal of the clamping switch is smaller than a predetermined clamping impedance; wherein the secondary side power-on time period indicates a time period which is prior to the output voltage related voltage achieving a predetermined power-on voltage threshold.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 3:
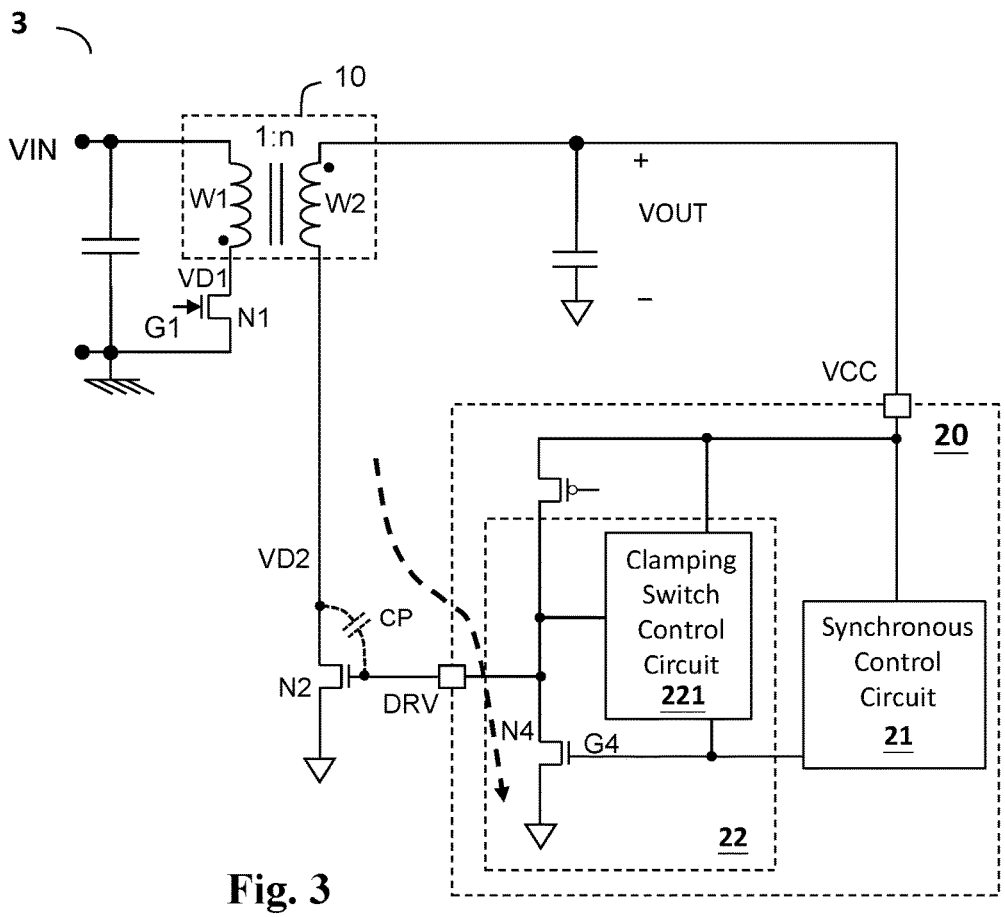
FIG. 3 shows a block diagram of an embodiment of the flyback power converter circuit according to the present invention.

FIG. 3 shows one embodiment of the flyback power converter circuit according to the present invention (flyback power converter circuit 3). The flyback power converter circuit 3 comprises a transformer 10, a power switch N1, a synchronous rectifier (SR) switch N2, and a secondary side control circuit 20. The transformer 10 includes a primary side winding W1 for receiving an input voltage VIN and a secondary side winding W2 for generating an output voltage VOUT. The power switch N1, which is coupled to the primary side winding W1 and controlled by a primary side control circuit, controls a conduction time of the primary side winding W1 by for example but not limited to PWM control scheme. The synchronous rectifier (SR) switch N2, which is coupled to the secondary side winding W2, controls a conduction time of the secondary side winding W2, such that the secondary side winding W2 is conductive when the primary side winding W1 is not conductive.

Figure 1A:
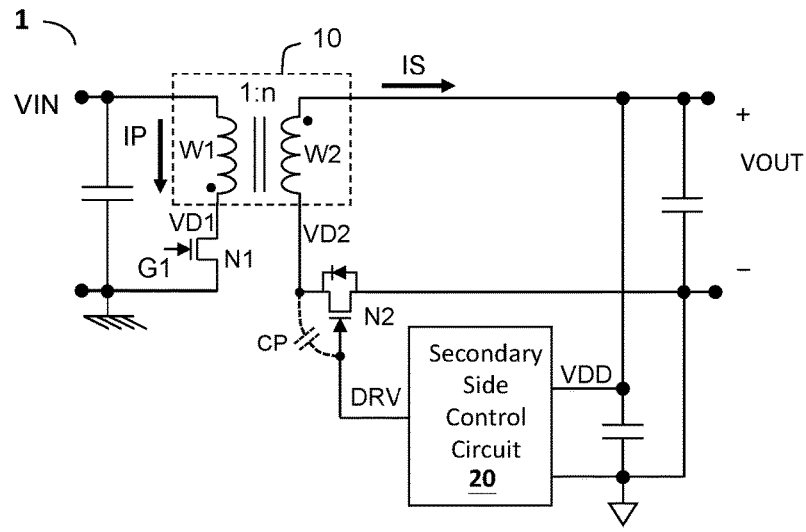
FIG. 1A shows a schematic diagram of a prior art flyback power converter circuit.
Figure 1B:
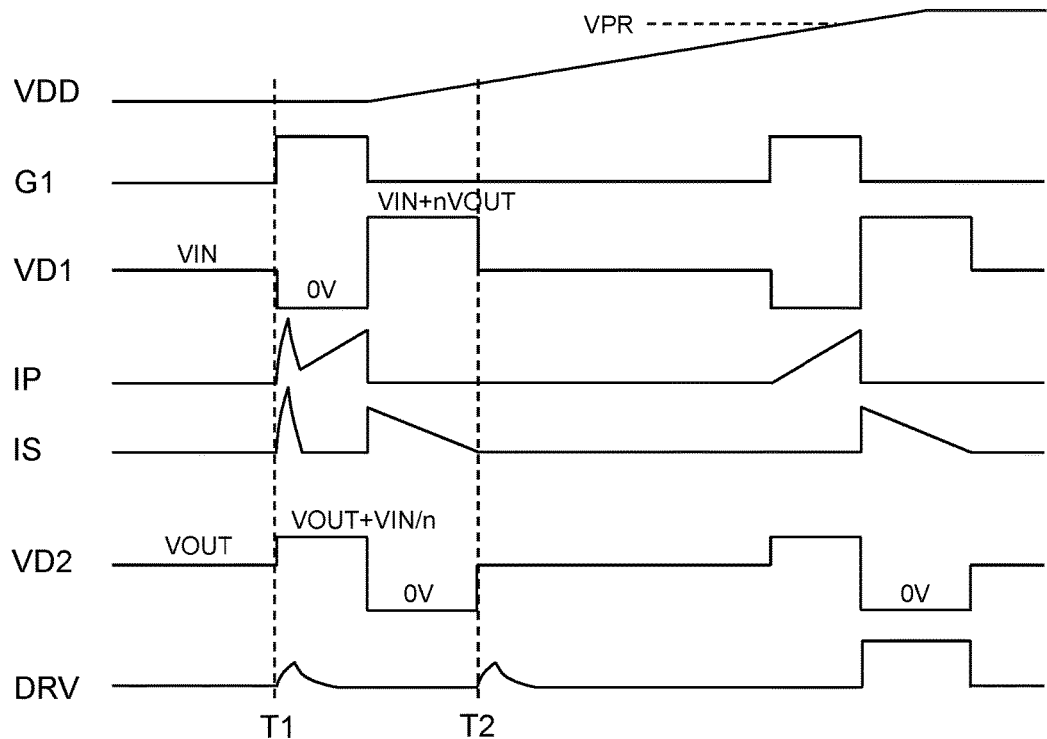
FIG. 1B shows schematic waveforms corresponding to the prior art shown in FIG. 1A.
Figure 2A:
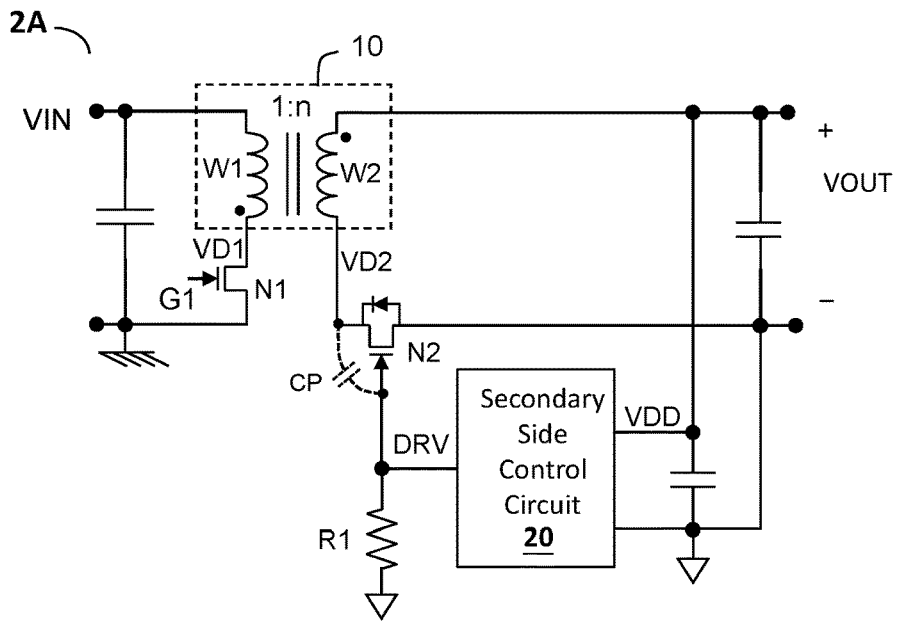
FIGS. 2A-2C show schematic diagrams of several prior art flyback power converter circuits.
Figure 2B:
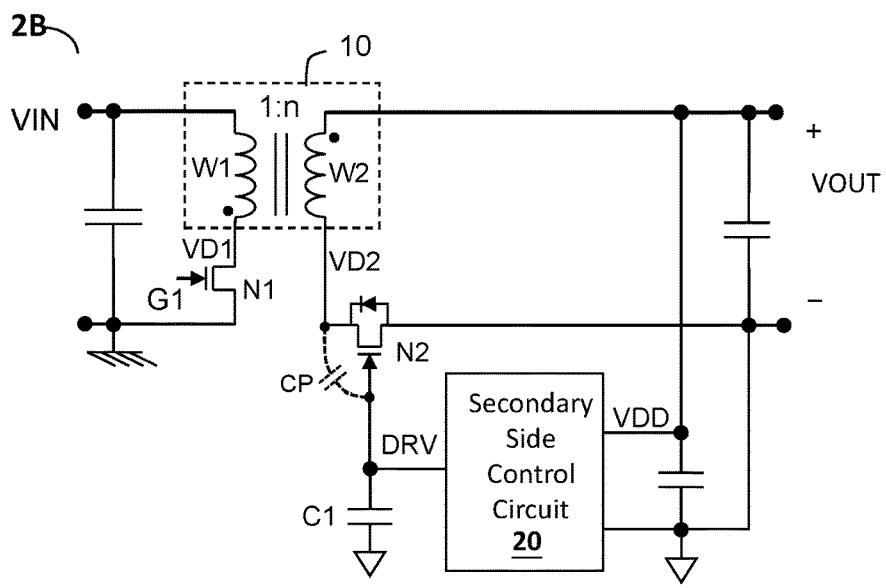
Figure 2C:
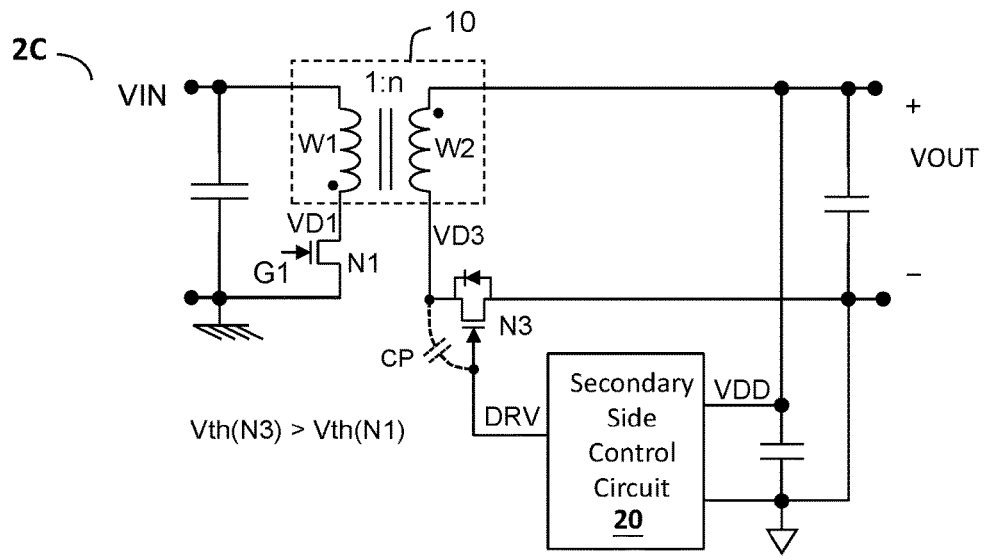

Still referring to FIG. 3, the secondary side control circuit 20, which is located at a secondary side of the transformer 10 and coupled to the SR switch N2, is configured to operably control the SR switch N2. The secondary side control circuit 20 includes a first driving switch N4, a synchronous control circuit 21, and a clamping circuit 22. A current inflow terminal of the first driving switch N4 is coupled to a control terminal DRV of the SR switch N2, and a current outflow terminal of the first driving switch N4 is coupled to a reference voltage (for example but not limited to the ground of the secondary side). The synchronous control circuit 21, which is coupled to a control terminal G4 of the first driving switch N4 and powered by an output voltage related voltage VCC, is configured to operably control the first driving switch N4 in a normal operation mode to operate the SR switch N2. Note that the output voltage related voltage VCC may be obtained for example directly from the output voltage VOUT, or by filtering, dividing or regulating the output voltage VOUT. The clamping circuit 22 includes the first driving switch N4 and a clamping switch control circuit 221. The clamping switch control circuit 221, which is coupled to a control terminal G4 of the first driving switch N4, is configured to operably control the control terminal G4 of the first driving switch N4 according to a voltage on a current inflow terminal of the first driving switch N4 and/or the output voltage related voltage VCC, such that in a secondary side power-on time period, an equivalent impedance of the current inflow terminal of the first driving switch N4 is smaller than a predetermined clamping impedance. The secondary side power-on time period refers to a time period before the output voltage related voltage VCC achieves a predetermined power-on voltage threshold (for example the VPR as shown in FIG. 1B).

In one embodiment, the predetermined clamping impedance relates to a parasitic capacitance between a gate and a drain of the SR switch N2 (i.e. CP as shown in the figure). In one preferred embodiment, the equivalent impedance of the first driving switch N4 is selected to be relatively low, and therefore before the output voltage VOUT reaches its operating voltage, that is, before the synchronous control circuit 21 can operate normally, the voltage of the control terminal DRV of the SR switch N2 will not rise due to the coupling effect of the parasitic capacitance of the SR switch N2; thus, the SR switch N2 will not become conductive erroneously, and problems in the prior art can be avoided. From another perspective, according to the present invention, since the equivalent impedance of the first driving switch N4 is relatively low, during the secondary side power-on time period, it can be ensured that the control terminal voltage of the SR switch N2 is lower than a predetermined voltage upper limit such that the SR switch N2 will not be turned ON erroneously.

Note that in the aforementioned embodiment, the clamping operation as described above is achieved by the first driving switch N4; however, this is not to limit the scope of the present invention. In other embodiments, the clamping operation can be achieved by a clamping switch other than the first driving switch N4. In this case, the current inflow terminal of the clamping switch is coupled to the control terminal DRV of the SR switch N2, and its current outflow terminal is coupled to the ground of the secondary side, and a control terminal of the clamping switch is controlled by the clamping switch control circuit 221.

Figure 4A:
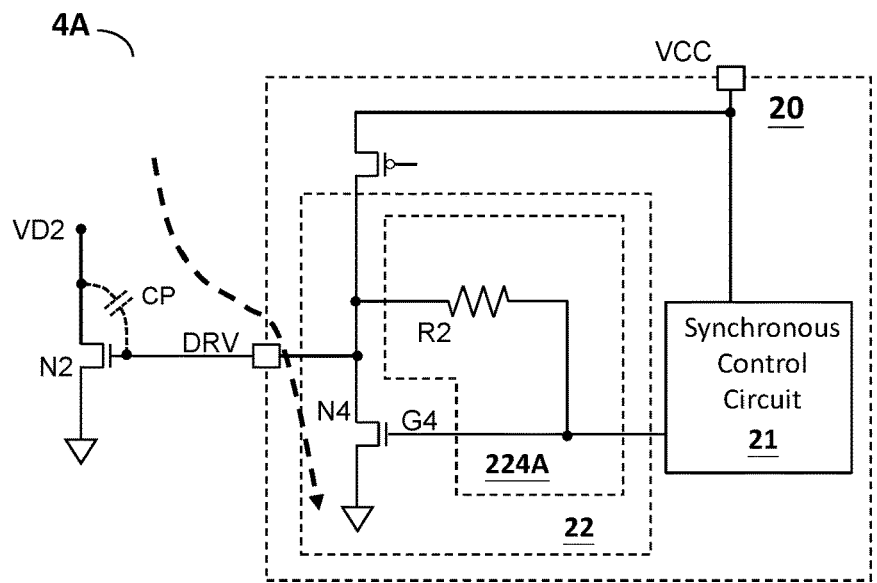
FIGS. 4A-4B show schematic diagrams of embodiments of the flyback power converter circuit according to the present invention.
Figure 4B:
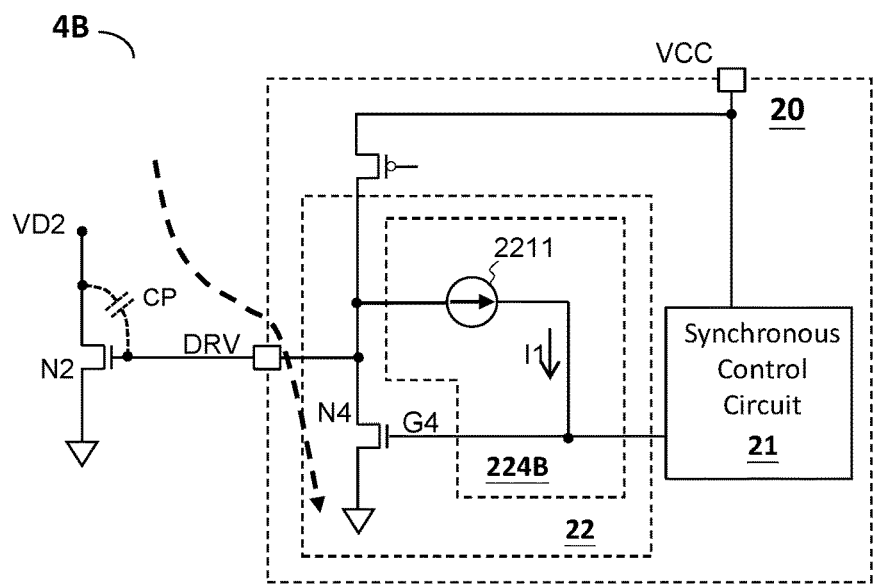

FIGS. 4A and 4B show embodiments of the flyback power converter circuit according to the present invention (flyback power converter circuits 4A and 4B, only relevant parts of the circuits are shown). In the embodiments of FIGS. 4A and 4B, the clamping switch control circuit 224A and 224B include a clamping resistor R2 and a clamping current source circuit 2211 respectively. The clamping resistor R2 or the clamping current source circuit 2211 is coupled between the control terminal G4 and the current inflow terminal (i.e. the control terminal DRV of the SR switch N2) of the clamping switch (i.e. the driving switch N4), so that in the secondary side power-on time period, the equivalent impedance of the current inflow terminal DRV of the clamping switch is smaller than the predetermined clamping impedance. The clamping circuit 2211 generates a clamping current I1 from the current inflow terminal DRV of the clamping switch to the control terminal G4 of the clamping switch. In the embodiment shown in FIG. 4A or 4B, the clamping resistor R2 or the clamping current source circuit 2211 configures the clamping switch as a diode, such that it has a smaller equivalent impedance and hence can better resist the parasitic capacitance coupling effect.

Figure 5A:
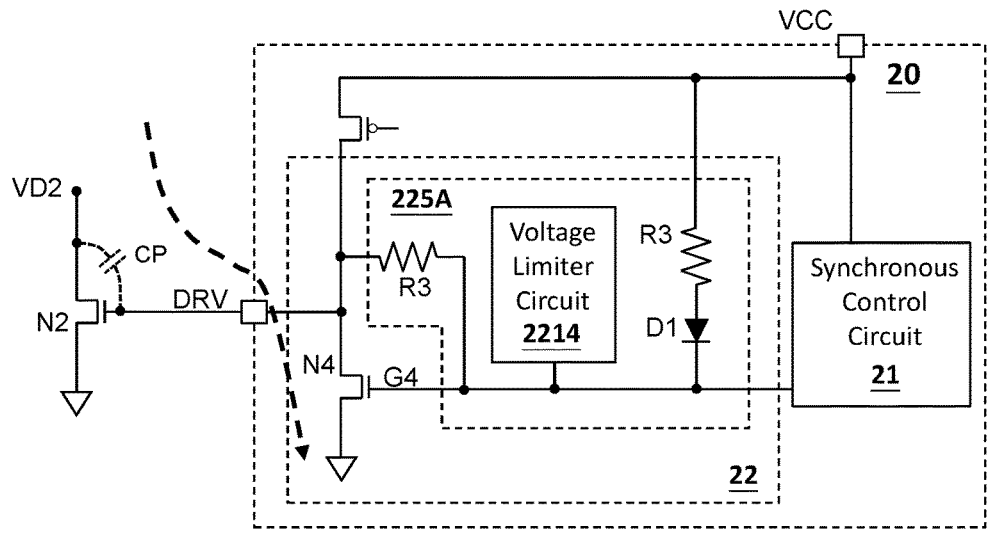
FIGS. 5A-5B show schematic diagrams of embodiments of the flyback power converter circuit according to the present invention.
Figure 5B:
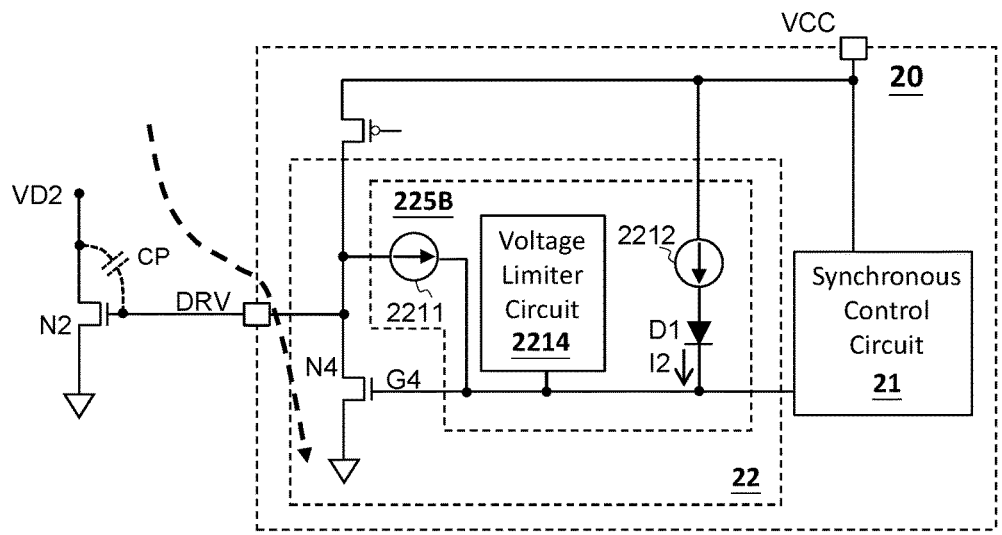

FIGS. 5A and 5B show embodiments of the flyback power converter circuit according to the present invention (flyback power converter circuits 5A and 5B, only relevant parts of the circuits are shown). The embodiments of FIGS. 5A and 5B are similar to those in FIGS. 4A and 4B, but the clamping switch control circuit 225A and 225B respectively further include a clamping resistor R3 and a clamping current source circuit 2212. The clamping resistor R3 or the clamping current source circuit 2212 is coupled between the control terminal G4 of the clamping switch (i.e. the driving switch N4) and the output voltage related voltage VCC, so that in a secondary side power-on time period, the equivalent impedance of the current inflow terminal DRV of the clamping switch is smaller than the predetermined clamping impedance. The clamping circuit 2212 generates a clamping current 12 from the output voltage related voltage VCC to the control terminal G4 of the clamping switch. In the embodiments shown in FIGS. 5A and 5B, if the SR switch N2 is turned ON due to the parasitic capacitance effect during the secondary side power-on period, the output voltage VOUT will rise to a certain level and the output voltage related voltage VCC will correspondingly rise. The rise of the output voltage related voltage VCC will partially of fully turned ON the clamping switch by the connection of the clamping resistor R3 or the clamping current source circuit 2212, such that the clamping switch has a smaller equivalent impedance and hence can better resist the parasitic capacitance coupling effect.

Still referring to FIGS. 5A and 5B, in one embodiment, the clamping switch control circuit 225A and 225B further include a reverse blocking diode D1. The reverse blocking diode D1 is coupled in series between the control terminal G4 of the clamping switch and the clamping resistor R3 or the clamping current source circuit 2212, wherein the current outflow terminal of the reverse blocking diode D1 is electrically connected to the control terminal of the clamping switch, to block a reverse current. Besides, the clamping switch control circuit 225A or 225B may further includes a voltage limiter circuit 2214 which limits the control terminal voltage of the clamping switch to be not larger than a predetermined voltage upper limit to protect the clamping switch from damage due to overly high voltage on its control terminal.

Note that in other embodiments, the clamping resistor R2, the clamping current source circuit 2211, the reverse blocking diode D1, or the voltage limiter circuit 2214 as shown in FIGS. 5A and 5B may be omitted. In other words, the clamping switch control circuit 225A and 225B may achieve the clamping functions only by the clamping resistor R3 and the clamping current source current 2212, respectively.

Figure 6A:
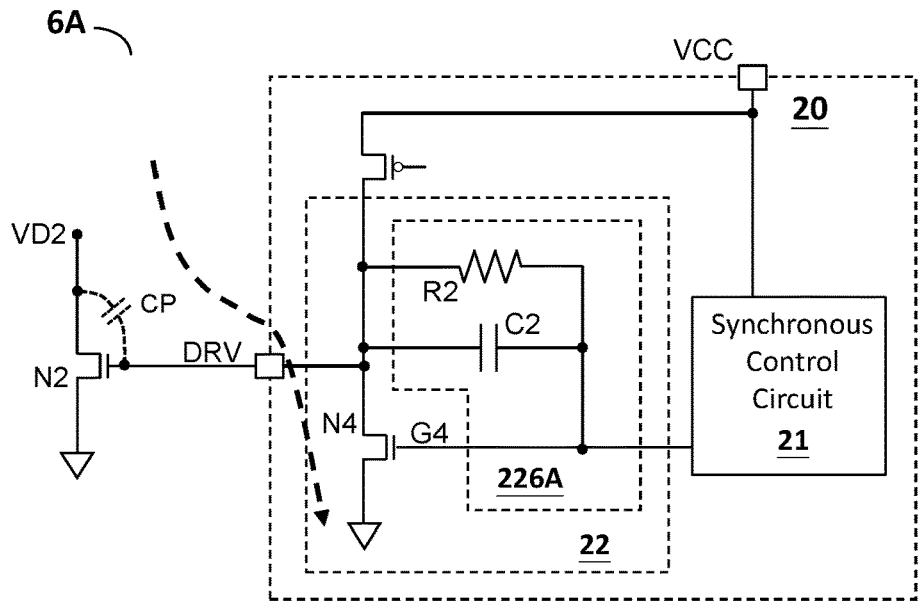
FIGS. 6A-6B show schematic diagrams of embodiments of the flyback power converter circuit according to the present invention.
Figure 6B:
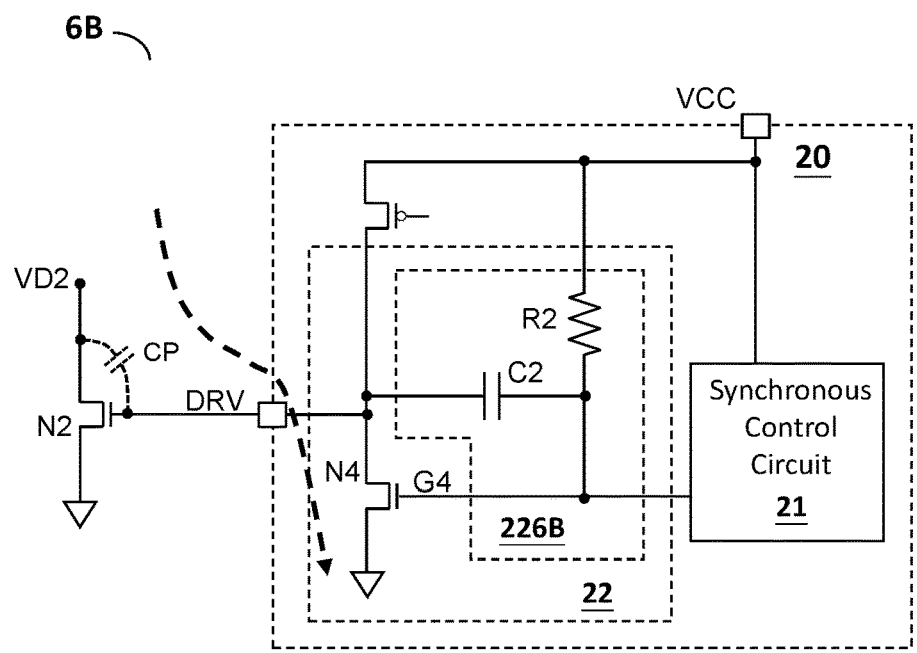

FIGS. 6A and 6B show embodiments of the flyback power converter circuit according to the present invention (flyback power converter circuits 6A and 6B, only relevant parts of the circuits are shown). The embodiments of FIGS. 6A and 6B are similar to those in FIGS. 4A and 5A, but the clamping switch control circuit 226A and 226B further include a clamping capacitor C2 which is coupled between the control terminal G4 and the current inflow terminal (i.e. the control terminal DRV of the SR switch N2) of the clamping switch (i.e. the driving switch N4). The magnitude of the equivalent impedance of the clamping switch varies under different frequencies due to the clamping capacitor C2. More specifically, in this embodiment, the clamping capacitor C2 can cause the equivalent impedance of the clamping switch to be even lower at a higher frequency, which therefore can further reduce the parasitic capacitance coupling effect in high frequency applications. Note that the connection, the location and the number of the clamping capacitor C2 in these embodiments are for illustration but not for limiting the scope of the present invention; the clamping capacitor C2 can be connected otherwise and there can be more than one clamping capacitor, as those skilled in this art may readily conceive according to the teaching of the present invention.

Figure 7A:
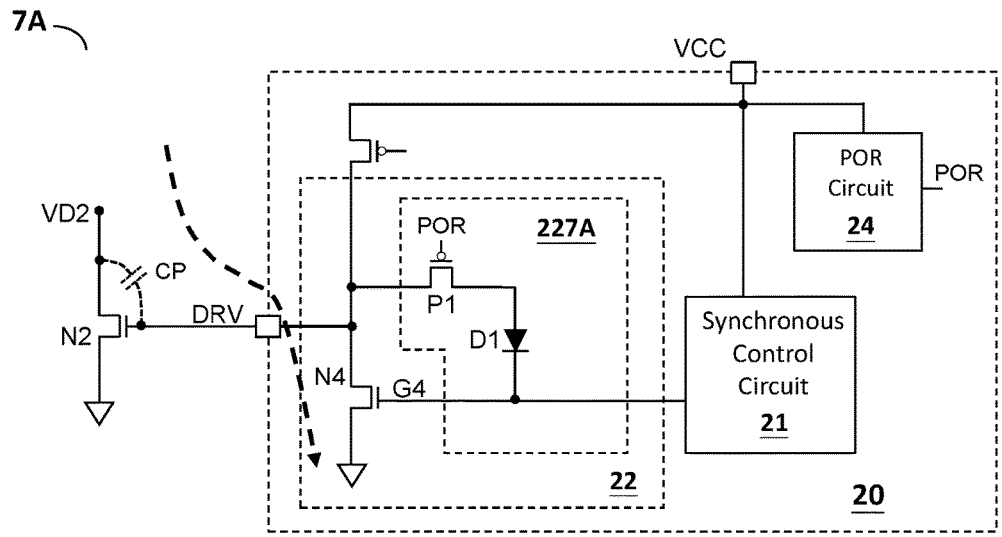
FIGS. 7A-7B show schematic diagrams of embodiments of the flyback power converter circuit according to the present invention.
Figure 7B:
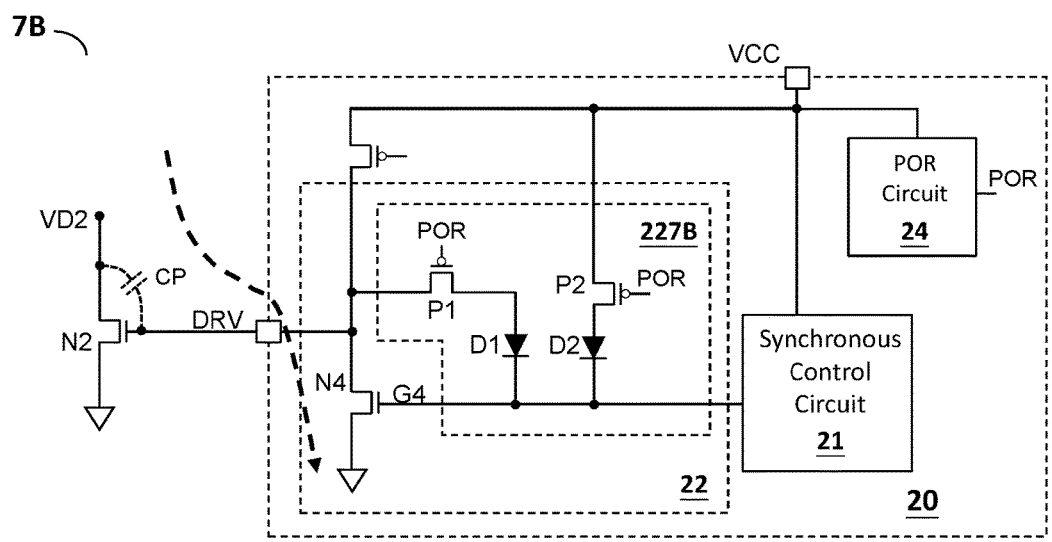

FIGS. 7A and 7B show embodiments of the flyback power converter circuit according to the present invention (flyback power converter circuits 7A and 7B, only relevant parts of the circuits are shown). In the embodiments of FIG. 7A, the secondary side control circuit 20 includes a power-on reset (POR) circuit 24 which generates a power-on reset signal POR according to the output voltage related voltage VCC and a reset voltage threshold VPR (the reset voltage threshold VPR for example maybe the same as the aforementioned normal operating threshold VPR). In this embodiment, the clamping switch control circuit 227A includes an impedance control switch P1 which is coupled between the control terminal G4 and the current inflow terminal (i.e. the control terminal DRV of the SR switch N2) of the clamping switch (i.e. the driving switch N4), wherein the power-on reset signal POR controls the impedance control switch P1 such that in the secondary side power-on time period, the equivalent impedance of the current inflow terminal DRV of the clamping switch is smaller than the predetermined clamping impedance. In the embodiments of FIG. 7B, the clamping switch control circuit 227B further includes an impedance control switch P2 which is coupled between the control terminal G4 of the clamping switch (i.e. the driving switch N4) and the output voltage related voltage VCC. In this embodiment, the impedance control switch P2 replaces the aforementioned clamping resistor or the clamping current source circuit. The operation mechanism is similar to the aforementioned embodiments, such as those in FIGS. 4A and 5A. In one preferred embodiment, the impedance control switches P1 and P2 for example may be P type transistors.

Still referring to FIGS. 7A and 7B, in one embodiment, the clamping switch control circuit 227A and 227B may respectively further include reverse blocking diodes D1 and D2; the reverse blocking diode D1 or D2 is coupled to the impedance control switch P1 or P2 in series between the control terminal G4 of the clamping switch and the output voltage related voltage VCC, wherein the current outflow terminal of the reverse blocking diode D1 or D2 is electrically connected to the control terminal G4 of the clamping switch, to block a reverse current. Note that in other embodiments, the clamping control switch P1 in FIG. 7B or the reverse blocking diode D1 or D2 in FIGS. 7A and 7B may be omitted. In other words, the clamping switch control circuit 227B may achieve the clamping functions only by the clamping control switch P2.

Figure 8A:
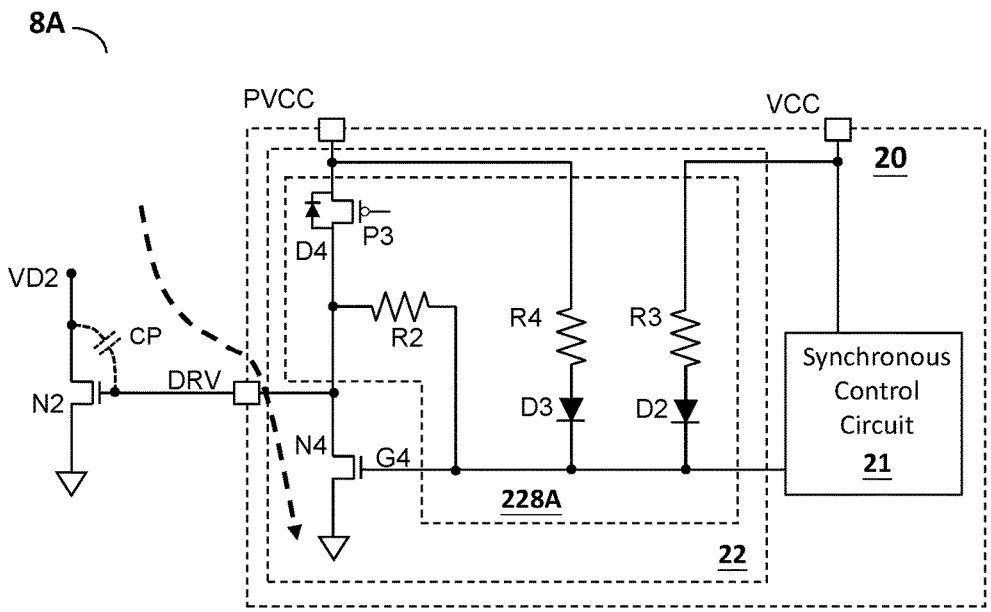
FIGS. 8A-8B show schematic diagrams of embodiments of the flyback power converter circuit according to the present invention.
Figure 8B:
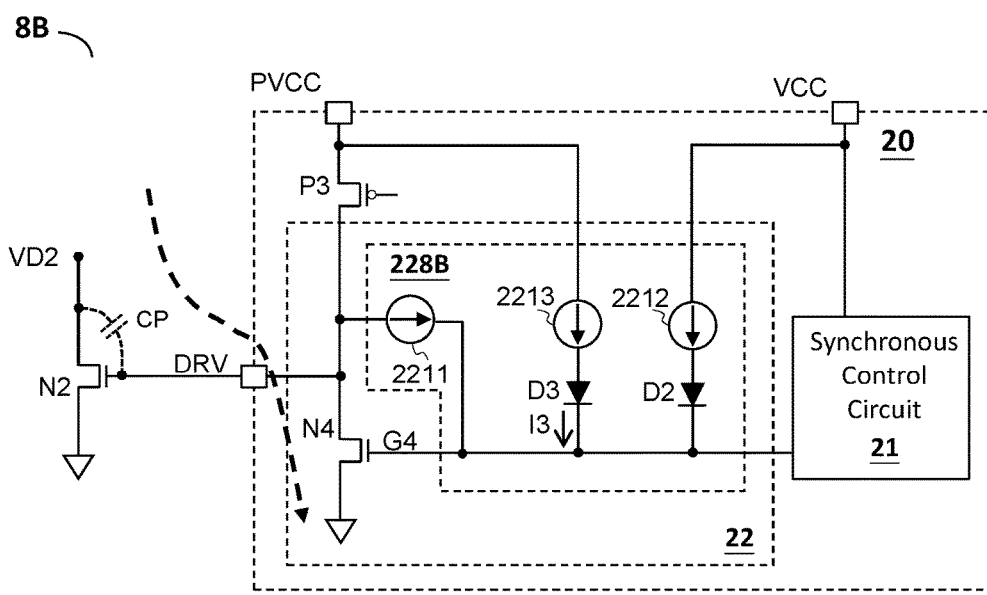

FIGS. 8A and 8B show embodiments of the flyback power converter circuit according to the present invention (flyback power converter circuits 8A and 8B, only relevant parts of the circuits are shown). The embodiments of FIGS. 8A and 8B are similar to those in FIGS. 5A and 5B, but the secondary side control circuit 20 further includes a second driving switch P3 which is coupled between the control terminal DRV of the SR switch N2 and a driving input voltage PVCC. The clamping switch control circuit 228A and 228B respectively further include a clamping resistor R4 and a clamping current source circuit 2213. The clamping resistor R4 or the clamping current source circuit 2213 is coupled between the control terminal G4 of the clamping switch (i.e. the driving switch N4) and driving input voltage PVCC, so that in the secondary side power-on time period, the equivalent impedance of the current inflow terminal DRV of the clamping switch is smaller than the predetermined clamping impedance. The clamping circuit 2213 generates a clamping current 13 from the driving input voltage PVCC to the control terminal G4 of the clamping switch. The driving input voltage PVCC is a supply voltage obtained by direct coupling to the output voltage VOUT, or by filtering, dividing or regulating the output voltage VOUT. The operation mechanism of this embodiment is similar to that in the embodiments of FIGS. 5A and 5B. When the output voltage VOUT rises due to the parasitic capacitance coupling effect, the driving input voltage PVCC correspondingly rises, and therefore the equivalent impedance of the clamping switch can be reduced by the clamping resistor R4 or the clamping current source circuit 2213.

Besides, in one embodiment wherein the second driving switch P3 includes for example but not limited to a MOS transistor, the clamping switch control circuit 228B further includes a body diode D4 of the second driving switch P3. Still referring to FIG. 8A, in this embodiment, the body diode D4 provides a more direct current path. When the control terminal DRV voltage of the SR switch N2 rises due to the parasitic capacitance coupling effect, the body diode D4 is forward conductive; the driving input voltage PVCC rises in correspondence with the control terminal DRV voltage of the SR switch N2, whereby the equivalent impedance of the clamping switch becomes smaller in correspondence with the rising of the voltage on the control terminal G4 of the clamping switch through R4.

Still referring to FIGS. 8A and 8B, in one embodiment, the clamping switch control circuits 228A and 228B further include a reverse blocking diode D3 respectively, wherein the reverse blocking diode D3 is coupled in series between the control terminal G4 of the clamping switch and the clamping resistor R4 or the clamping current source circuit 2213 to block a reverse current; the current outflow terminal of the reverse blocking diode D3 is electrically connected to the control terminal of the clamping switch. Note that in other embodiments, the clamping resistor R2, R3, the clamping current source circuit 2211, 2212, or the reverse blocking diode D2, D3 as shown in FIGS. 8A and 8B may be omitted. In other words, the clamping switch control circuits 228A and 228B may achieve the clamping functions only by the clamping resistor R4 and the clamping current source current 2213. In one embodiment, the body diode D4 may also be omitted. Besides, from another perspective, in the embodiments of FIGS. 8A and 8B, when the reverse blocking diodes D2 and D3 both exist, the combination of the diodes D2 and D3 can be considered as a selection circuit which can select the higher one of PVCC and VCC automatically.

Figure 9:
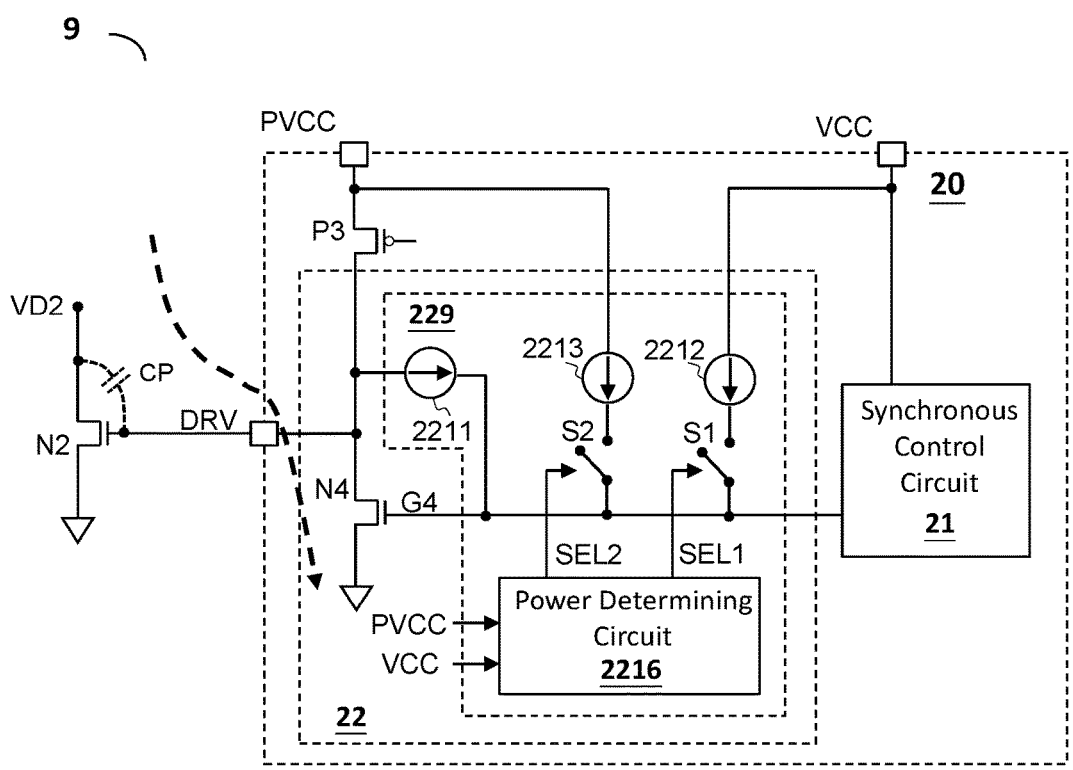
FIG. 9 shows a schematic diagram of an embodiment of the flyback power converter circuit according to the present invention.

FIG. 9 shows an embodiment of the flyback power converter circuit according to the present invention (flyback power converter circuit 9, only a relevant part of the circuit is shown). This embodiment is similar to that of FIG. 8B, but the clamping switch control circuit 229 includes an impedance control switches S1 and S2. As shown in the figure, the impedance control switch S1 and the clamping current source circuit 2212 are coupled in series between the control terminal G4 of the clamping switch (i.e. the driving switch N4) and the output voltage related voltage VCC, and the impedance control switch S2 and the clamping current source circuit 2213 are coupled in series between the control terminal G4 of the clamping switch (i.e. the driving switch N4) and the driving input voltage PVCC. The clamping switch control circuit 229 further includes a power determining circuit 2216 which generates a switch control signal SEL (including SEL1 and SEL2 for controlling S1 and S2 respectively) according to the output voltage related voltage VCC and the driving input voltage PVCC, to control the switching of the impedance control switches S1 and S2, such that in a secondary side power-on time period the equivalent impedance of the current inflow terminal DRV of the clamping switch is smaller than the predetermined clamping impedance. In one embodiment, the clamping current source circuit 2211 maybe omitted. In one embodiment, the clamping current source circuit 2211, 2212 and 2213 may be replaced by R2, R3 and R4 as in the previous embodiments.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. As an example, the "clamping capacitor C2" can be used also in other embodiments (such as those including a clamping current source circuit). As another example, the "clamping resistor" and the "clamping current source circuit" can be used in combinations in various ways. Taking the embodiment of FIG. 8A as an example, R4 can be replaced by a clamping current source circuit and is combined with R3, which still can achieve the clamping function (with corresponding modifications). Furthermore, those skilled in this art can readily conceive variations and modifications within the spirit of the present invention. For example, in an embodiment which includes a clamping switch other than the driving switch N4, the driving switch N4 can still be configured to operate the clamping function at the same time. As another example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. The spirit of the present invention should cover all such and other modifications and variations, which should be interpreted to fall within the scope of the following claims and their equivalents.

What is claimed is:

1. A flyback power converter circuit, comprising:
 a transformer, which includes a primary side winding for receiving an input voltage and a secondary side winding for generating an output voltage;
 a power switch which is coupled to the primary side winding, and configured to operably control a conduction time of the primary side winding;
 a synchronous rectifier (SR) switch which is coupled to the secondary side winding, and configured to control a conduction time of the secondary side winding which is conductive when the primary side winding is not conductive; and
 a secondary side control circuit which is located at a secondary side of the transformer and is coupled to the SR switch, and which is configured to operably control the SR switch, the secondary side control circuit including:
 a first driving switch, wherein a current inflow terminal of the first driving switch is coupled to a control terminal of the SR switch, and a current outflow terminal of the first driving switch is coupled to a reference voltage;

a synchronous control circuit which is coupled to a control terminal of the first driving switch and is powered by a voltage which is related to the output voltage (an output voltage related voltage), the synchronous control circuit being configured to operably control the first driving switch to drive the SR switch to generate the output voltage in a normal operation mode, wherein the normal operation mode is when the output voltage related voltage exceeds a predetermined power-on voltage threshold; and a clamping circuit, including:
the first driving switch; and
a clamping switch control circuit which is coupled to the control terminal of the first driving switch, and configured to operably control the control terminal of the first driving switch according to a voltage on a current inflow terminal of the first driving switch, such that in a secondary side power-on time period, an equivalent impedance of the current inflow terminal of the first driving switch is smaller than a predetermined clamping impedance, whereby the SR switch is not turned ON erroneously due to coupling by a parasitic capacitor between the control terminal and the current inflow terminal of the SR switch;
wherein the secondary side power-on time period is a time period before the output voltage related voltage achieves the predetermined power-on voltage threshold.

2. The flyback power converter circuit of claim 1, wherein the clamping switch control circuit includes:
a first clamping resistor and/or a first clamping current source circuit, which is coupled between the control terminal and the current inflow terminal of first driving switch, wherein in the secondary side power-on time period, when a voltage on the control terminal of the SR switch is raised due to coupling by the parasitic capacitor, a portion of a current flowing through the parasitic capacitor flows through the first clamping resistor and/or the first clamping current source circuit to raise a voltage on the control terminal of the first driving switch, such that the equivalent impedance of the current inflow terminal of the first driving switch is smaller than the predetermined clamping impedance;
wherein when the first clamping current source circuit is employed, the first clamping current source circuit is configured to operably generate a first clamping current from the current inflow terminal of the first driving switch to the control terminal of the first driving switch.

3. The flyback power converter circuit of claim 2, wherein the clamping switch control circuit further includes a clamping capacitor which is coupled in parallel with the first clamping resistor and/or the first clamping current source circuit.

4. The flyback power converter circuit of claim 2, wherein the clamping switch control circuit further includes a reverse blocking diode which is coupled in series between the control terminal of the first driving switch and the first clamping resistor, or between the control terminal of the first driving switch and the first clamping current source circuit, and is configured to operably block a reverse current, wherein a current outflow terminal of the reverse blocking diode is electrically connected to the control terminal of the first driving switch.

5. The flyback power converter circuit of claim 1, wherein the clamping switch control circuit includes:
a second clamping resistor and/or a second clamping current source circuit, which is coupled between the control terminal of the first driving switch and the output voltage related voltage such that in the secondary side power-on time period, the equivalent impedance of the current inflow terminal of the first driving switch is smaller than the predetermined clamping impedance;
wherein when the second clamping current source circuit is employed, the second clamping current source circuit is configured to operably generate a second clamping current from the output voltage related voltage to the control terminal of the first driving switch.

6. The flyback power converter circuit of claim 5, wherein the clamping switch control circuit further includes a clamping capacitor which is coupled in parallel with the first clamping resistor and/or the first clamping current source circuit.

7. The flyback power converter circuit of claim 5, wherein the clamping switch control circuit further includes a voltage limiting circuit which limits a voltage on the control terminal of the first driving switch to be not larger than a predetermined voltage upper limit.

8. The flyback power converter circuit of claim 5, wherein the clamping switch control circuit further includes a reverse blocking diode which is coupled in series between the control terminal of the first driving switch and the second clamping resistor, or between the control terminal of the first driving switch and the second clamping current source circuit, and is configured to operably block a reverse current, wherein a current outflow terminal of the reverse blocking diode is electrically connected to the control terminal of the first driving switch.

9. The flyback power converter circuit of claim 5, wherein the secondary side control circuit further includes a second driving switch, coupled between the control terminal of the SR switch and a driving input voltage, wherein the clamping switch control circuit further includes:
a second impedance control switch, coupled in series between the control terminal of the first driving switch and the second clamping resistor or the second clamping current source circuit;
a third clamping resistor and/or a third clamping current source circuit;
a third impedance control switch, coupled in series with the third clamping resistor or the third clamping current source circuit between the control terminal of the first driving switch and the driving input voltage, wherein the third clamping current source circuit is configured to operably generate a third clamping current from the driving input voltage to the control terminal of the first driving switch; and
a power determining circuit, configured to operably generate a switch control signal according to the output voltage related voltage and the driving input voltage to control the switching of the second impedance control switch and the third impedance control switch, such that in the secondary side power-on time period, the equivalent impedance of the current inflow terminal of the first driving switch is smaller than the predetermined clamping impedance.

10. The flyback power converter circuit of claim 1, wherein the secondary side control circuit further includes a second driving switch which is coupled between the control terminal of the SR switch and a driving input voltage, wherein the clamping switch control circuit includes:
a third clamping resistor and/or a third clamping current source circuit, which is coupled between the control terminal of the first driving switch and the driving input voltage such that in the secondary side power-on time period, the equivalent impedance of the current inflow terminal of the first driving switch is smaller than the predetermined clamping impedance;
wherein when the third clamping current source circuit is employed, the third clamping current source circuit is configured to operably generate a third clamping current from the driving input voltage to the control terminal of the first driving switch, wherein the driving input voltage relates to the output voltage.

11. The flyback power converter circuit of claim 10, wherein the clamping switch control circuit further includes a clamping capacitor which is coupled in parallel with the first clamping resistor and/or the first clamping current source circuit.

12. The flyback power converter circuit of claim 10, wherein the clamping switch control circuit further includes a voltage limiting circuit which limits a voltage on the control terminal of the first driving switch to be not larger than a predetermined voltage upper limit.

13. The flyback power converter circuit of claim 10, wherein the clamping switch control circuit further includes a reverse blocking diode which is coupled in series between the control terminal of the first driving switch and the third clamping resistor, or between the control terminal of the first driving switch and the third clamping current source circuit, and is configured to operably block a reverse current, wherein a current outflow terminal of the reverse blocking diode is electrically connected to the control terminal of the first driving switch.

14. The flyback power converter circuit of claim 10, wherein the clamping switch control circuit further includes a body diode of the second driving switch.

15. The flyback power converter circuit of claim 1, wherein the secondary side control circuit further includes a power-on reset circuit which generates a power-on reset signal according to the output voltage and a reset voltage threshold, wherein the clamping switch control circuit includes:
a first impedance control switch, electrically coupled between the control terminal of the first driving switch and the output voltage related voltage or between the control terminal of the first driving switch and the current inflow terminal of the first driving switch, wherein the power-on reset signal controls the first impedance control switch, such that in the secondary side power-on time period, the equivalent impedance of the current inflow terminal of the first driving switch is smaller than the predetermined clamping impedance, whereby the SR switch is not turned ON erroneously.

16. The flyback power converter circuit of claim 15, wherein the clamping switch control circuit further includes a reverse blocking diode which is coupled in series between the control terminal of the first driving switch and the impedance control switch, and is configured to operably block a reverse current, wherein a current outflow terminal of the reverse blocking diode is electrically connected to the control terminal of the first driving switch.

17. A secondary control circuit, for use in a flyback power converter circuit which includes: a transformer, which includes a primary side winding for receiving an input voltage and a secondary side winding for generating an output voltage; a power switch which is coupled to the primary side winding, and configured to operably control a conduction time of the primary side winding; and a synchronous rectifier (SR) switch which is coupled to the secondary side winding, and configured to control a conduction time of the secondary side winding which is conductive when the primary side winding is not conductive; the secondary control circuit being located at a secondary side of the transformer and coupled to the SR switch configured to operably control the SR switch; the secondary control circuit comprising:
a first driving switch, wherein a current inflow terminal of the first driving switch is coupled to a control terminal of the SR switch, and a current outflow terminal of the first driving switch is coupled to a reference voltage;
a synchronous control circuit which is coupled to a control terminal of the first driving switch and is powered by a voltage which is related to the output voltage (an output voltage related voltage), the synchronous control circuit being configured to operably control the first driving switch to drive the SR switch to generate the output voltage in a normal operation mode, wherein the normal operation mode is when the output voltage related voltage exceeds a predetermined power-on voltage threshold; and
a clamping circuit, including:
the first driving switch; and
a clamping switch control circuit which is coupled to the control terminal of the first driving switch, and configured to operably control the control terminal of the first driving switch according to a voltage on a current inflow terminal of the first driving switch and/or the output voltage related voltage, such that in a secondary side power-on time period, an equivalent impedance of the current inflow terminal of the first driving switch is smaller than a predetermined clamping impedance, whereby the SR switch is not turned ON erroneously due to coupling by a parasitic capacitor between the control terminal and the current inflow terminal of the SR switch;
wherein the secondary side power-on time period indicates a time period which is prior to the output voltage related voltage achieving a predetermined power-on voltage threshold.

18. The secondary control circuit of claim 17, wherein the clamping switch control circuit includes:
a first clamping resistor and/or a first clamping current source circuit, which is coupled between the control terminal and the current inflow terminal of the first driving switch, wherein in the secondary side power-on time period, when a voltage on the control terminal of the SR switch is raised due to coupling by the parasitic capacitor, a portion of a current flowing through the parasitic capacitor flows through the first clamping resistor and/or the first clamping current source circuit to raise a voltage on the control terminal of the first driving switch, such that the equivalent impedance of the current inflow terminal of the first driving switch is smaller than the predetermined clamping impedance;
wherein when the first clamping current source circuit is employed, the first clamping current source circuit is configured to operably generate a first clamping current from the current inflow terminal of the first driving switch to the control terminal of the first driving switch.

19. The secondary control circuit of claim 18, wherein the clamping switch control circuit further includes a clamping capacitor which is coupled in parallel with the first clamping resistor and/or the first clamping current source circuit.

20. The secondary control circuit of claim 18, wherein the clamping switch control circuit further includes a reverse blocking diode which is coupled in series between the control terminal of the first driving switch and the first clamping resistor, or between the control terminal of the first driving switch and the first clamping current source circuit, and is configured to operably block a reverse current, wherein a current outflow terminal of the reverse blocking diode is electrically connected to the control terminal of the first driving switch.

21. The secondary control circuit of claim 17, wherein the clamping switch control circuit includes:
   a second clamping resistor and/or a second clamping current source circuit, which is coupled between the control terminal of the first driving switch and the output voltage related voltage such that in the secondary side power-on time period, the equivalent impedance of the current inflow terminal of the first driving switch is smaller than the predetermined clamping impedance;
   wherein when the second clamping current source circuit is employed, the second clamping current source circuit is configured to operably generate a second clamping current from the output voltage related voltage to the control terminal of the first driving switch.

22. The secondary control circuit of claim 21, wherein the clamping switch control circuit further includes a clamping capacitor which is coupled in parallel with the first clamping resistor and/or the first clamping current source circuit.

23. The secondary control circuit of claim 21, wherein the clamping switch control circuit further includes a voltage limiting circuit which limits a voltage on the control terminal of the first driving switch to be not larger than a predetermined voltage upper limit.

24. The secondary control circuit of claim 21, wherein the clamping switch control circuit further includes a reverse blocking diode which is coupled in series between the control terminal of the first driving switch and the second clamping resistor, or between the control terminal of the first driving switch and the second clamping current source circuit, and is configured to operably block a reverse current, wherein a current outflow terminal of the reverse blocking diode is electrically connected to the control terminal of the first driving switch.

25. The secondary control circuit of claim 21, wherein the secondary side control circuit further includes a second driving switch, coupled between the control terminal of the SR switch and a driving input voltage, wherein the clamping switch control circuit further includes:
   a second impedance control switch, coupled in series between the control terminal of the first driving switch and the second clamping resistor or the second clamping current source circuit;
   a third clamping resistor and/or a third clamping current source circuit;
   a third impedance control switch, coupled in series with the third clamping resistor or the third clamping current source circuit between the control terminal of the first driving switch and the driving input voltage, wherein the third clamping current source circuit is configured to operably generate a third clamping current from the driving input voltage to the control terminal of the first driving switch; and
   a power determining circuit, and configured to operably generate a switch control signal according to the output voltage related voltage and the driving input voltage to control the switching of the second impedance control switch and the third impedance control switch, such that in the secondary side power-on time period, the equivalent impedance of the current inflow terminal of the first driving switch is smaller than the predetermined clamping impedance.

26. The secondary control circuit of claim 17, wherein the secondary side control circuit further includes a second driving switch which is coupled between the control terminal of the SR switch and a driving input voltage, wherein the clamping switch control circuit includes:
   a third clamping resistor and/or a third clamping current source circuit, which is coupled between the control terminal of the first driving switch and the driving input voltage such that in the secondary side power-on time period, the equivalent impedance of the current inflow terminal of the first driving switch is smaller than the predetermined clamping impedance;
   wherein when the third clamping current source circuit is employed, the third clamping current source circuit is configured to operably generate a third clamping current from the driving input voltage to the control terminal of the first driving switch, wherein the driving input voltage relates to the output voltage.

27. The secondary control circuit of claim 26, wherein the clamping switch control circuit further includes a clamping capacitor which is coupled in parallel with the first clamping resistor and/or the first clamping current source circuit.

28. The secondary control circuit of claim 26, wherein the clamping switch control circuit further includes a voltage limiting circuit which limits a voltage on the control terminal of the first driving switch to be not larger than a predetermined voltage upper limit.

29. The secondary control circuit of claim 26, wherein the clamping switch control circuit further includes a reverse blocking diode which is coupled in series between the control terminal of the first driving switch and the third clamping resistor, or between the control terminal of the first driving switch and the third clamping current source circuit, and is configured to operably block a reverse current, wherein a current outflow terminal of the reverse blocking diode is electrically connected to the control terminal of the first driving switch.

30. The secondary control circuit of claim 26, wherein the clamping switch control circuit further includes a body diode of the second driving switch.

31. The secondary control circuit of claim 17, further including a power-on reset circuit which generates a power-on reset signal according to the output voltage and a reset voltage threshold, wherein the clamping switch control circuit includes:
   a first impedance control switch, electrically coupled between the control terminal of the first driving switch and the output voltage related voltage or between the control terminal of the first driving switch and the current inflow terminal of the first driving switch, wherein the power-on reset signal controls the first impedance control switch, such that in the secondary side power-on time period, the equivalent impedance of the current inflow terminal of the first driving switch is smaller than the predetermined clamping impedance, whereby the SR switch is not turned ON erroneously.
   a current outflow terminal of the reverse blocking diode is.

32. The secondary control circuit of claim 31, wherein the clamping switch control circuit further includes a reverse blocking diode which is coupled in series between the control terminal of the first driving switch and the impedance control switch, and is configured to operably block a reverse current, wherein a current outflow terminal of the reverse blocking diode is electrically connected to the control terminal of the first driving switch.

33. A flyback power converter circuit, comprising:
a transformer, which includes a primary side winding for receiving an input voltage and a secondary side winding for generating an output voltage;
a power switch which is coupled to the primary side winding, and configured to operably control a conduction time of the primary side winding;
a synchronous rectifier (SR) switch which is coupled to the secondary side winding, and configured to control a conduction time of the secondary side winding which is conductive when the primary side winding is not conductive; and
a secondary side control circuit which is located at a secondary side of the transformer and is coupled to the SR switch, and which is configured to operably control the SR switch, the secondary side control circuit including:
  a first driving switch, wherein a current inflow terminal of the first driving switch is coupled to a control terminal of the SR switch, and a current outflow terminal of the first driving switch is coupled to a reference voltage;
  a second driving switch, coupled between the control terminal of the SR switch and a driving input voltage;
  a synchronous control circuit which is coupled to a control terminal of the first driving switch and is powered by a voltage which is related to the output voltage (an output voltage related voltage), the synchronous control circuit being configured to operably control the first driving switch to operate the SR switch; and
  a clamping circuit, including:
    the first driving switch; and
    a clamping switch control circuit which is coupled to the control terminal of the first driving switch, and configured to operably control the control terminal of the first driving switch according to a voltage on a current inflow terminal of the first driving switch, such that in a secondary side power-on time period, an equivalent impedance of the current inflow terminal of the first driving switch is smaller than a predetermined clamping impedance, whereby the SR switch is not turned ON erroneously;
    wherein the secondary side power-on time period is a time period before the output voltage related voltage achieves a predetermined power-on voltage threshold;
    wherein the clamping switch control circuit includes:
      a first clamping resistor and/or a first clamping current source circuit, which is coupled between the control terminal of the first driving switch and the output voltage related voltage such that in the secondary side power-on time period, the equivalent impedance of the current inflow terminal of the first driving switch is smaller than the predetermined clamping impedance;
      wherein when the first clamping current source circuit is employed, the first clamping current source circuit is configured to operably generate a first clamping current from the output voltage related voltage to the control terminal of the first driving switch;
      wherein the clamping switch control circuit further includes:
        a first impedance control switch, coupled in series between the control terminal of the first driving switch and the first clamping resistor or the first clamping current source circuit;
        a second clamping resistor and/or a second clamping current source circuit;
        a second impedance control switch, coupled in series with the second clamping resistor or the second clamping current source circuit between the control terminal of the first driving switch and the driving input voltage, wherein when the second clamping current source circuit is employed, the second clamping current source circuit is configured to operably generate a second clamping current from the driving input voltage to the control terminal of the first driving switch; and
        a power determining circuit, configured to operably generate a switch control signal according to the output voltage related voltage and the driving input voltage to control the switching of the first impedance control switch and the second impedance control switch, such that in the secondary side power-on time period, the equivalent impedance of the current inflow terminal of the first driving switch is smaller than the predetermined clamping impedance, wherein the driving input voltage relates to the output voltage.

34. A secondary control circuit, for use in a flyback power converter circuit which includes: a transformer, which includes a primary side winding for receiving an input voltage and a secondary side winding for generating an output voltage; a power switch which is coupled to the primary side winding, and configured to operably control a conduction time of the primary side winding; and a synchronous rectifier (SR) switch which is coupled to the secondary side winding, and configured to control a conduction time of the secondary side winding which is conductive when the primary side winding is not conductive; the secondary control circuit being located at a secondary side of the transformer and coupled to the SR switch configured to operably control the SR switch; the secondary control circuit comprising:
a first driving switch, wherein a current inflow terminal of the first driving switch is coupled to a control terminal of the SR switch, and a current outflow terminal of the first driving switch is coupled to a reference voltage;
a synchronous control circuit which is coupled to a control terminal of the first driving switch and is powered by a voltage which is related to the output voltage (an output voltage related voltage) , the synchronous control circuit being configured to operably control the first driving switch to operate the SR switch; and
a clamping circuit, including:
  the first driving switch; and
  a clamping switch control circuit which is coupled to the control terminal of the first driving switch, and configured to operably control the control terminal of the driving switch according to a voltage on a current inflow terminal of the first driving switch and/or the output voltage related voltage, such that in a secondary side power-on time period, an equivalent impedance of the current inflow terminal of the first driving switch is smaller than a predetermined clamping impedance;

wherein the secondary side power-on time period indicates a time period which is prior to the output voltage related voltage achieving a predetermined power-on voltage threshold;

wherein the clamping switch control circuit includes:
  a second clamping resistor and/or a second clamping current source circuit, which is coupled between the control terminal of the first driving switch and the output voltage related voltage such that in the secondary side power-on time period, the equivalent impedance of the current inflow terminal of the first driving switch is smaller than the predetermined clamping impedance;
  wherein when the second clamping current source circuit is employed, the second clamping current source circuit is configured to operably generate a second clamping current from the output voltage related voltage to the control terminal of the first driving switch;
  wherein the secondary side control circuit further includes a second driving switch, coupled between the control terminal of the SR switch and a driving input voltage, wherein the clamping switch control circuit further includes:
  a second impedance control switch, coupled in series between the control terminal of the first driving switch and the second clamping resistor or the second clamping current source circuit;
  a third clamping resistor and/or a third clamping current source circuit;
  a third impedance control switch, coupled in series with the third clamping resistor or the third clamping current source circuit between the control terminal of the first driving switch and the driving input voltage, wherein the third clamping current source circuit is configured to operably generate a third clamping current from the driving input voltage to the control terminal of the first driving switch; and
  a power determining circuit, and configured to operably generate a switch control signal according to the output voltage related voltage and the driving input voltage to control the switching of the second impedance control switch and the third impedance control switch, such that in the secondary side power-on time period, the equivalent impedance of the current inflow terminal of the first driving switch is smaller than the predetermined clamping impedance.

* * * * *